(No Model.)

N. H. FAY & W. SCOTT.
BOLT DOG FOR LATHES.

No. 319,472. Patented June 9, 1885.

Witnesses.
S. N. Piper.
Ernest B. Pratt.

Inventors.
Norman H. Fay
Walter Scott.
by R. H. Eddy atty.

N. PETERS, Photo-Lithographer, Washington, D. C.

United States Patent Office.

NORMAN HERBERT FAY AND WALTER SCOTT, OF DEXTER, MAINE.

BOLT-DOG FOR LATHES.

SPECIFICATION forming part of Letters Patent No. 319,472, dated June 9, 1885.

Application filed April 29, 1885. (No model.)

*To all whom it may concern:*

Be it known that we, NORMAN HERBERT FAY and WALTER SCOTT, of Dexter, in the county of Penobscot, in the State of Maine, have invented a new and useful Improvement in Bolt-Dogs for Lathes; and we do hereby declare the same to be described in the following specification, and represented in the accompanying drawings, of which—

Figure 1:
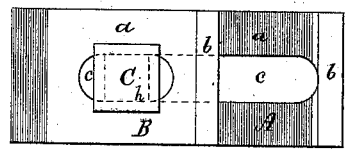
Figure 2:
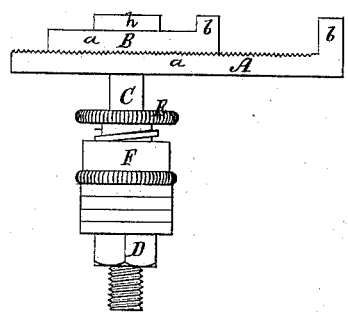
Figure 3:
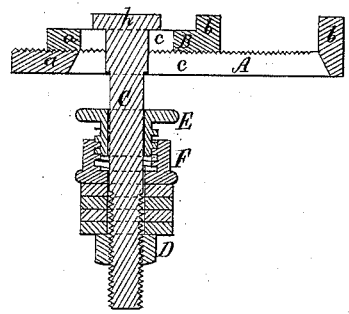
Figure 4:
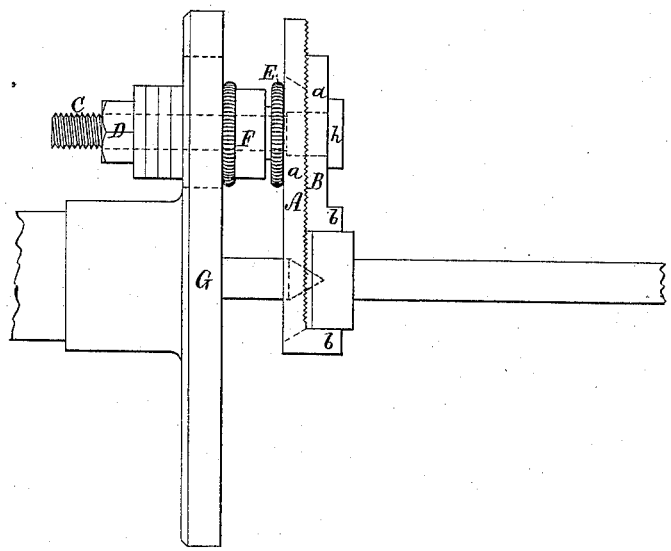

Figure 1 is a front view, Fig. 2 a side elevation, and Fig. 3 a longitudinal section, of the article or bolt-dog constituting our invention, the nature of which is defined in the claims hereinafter presented. Fig. 4 is a side view of the said bolt-dog as applied to the face-plate of a turning-lathe.

The dog is for the purpose of holding in a turning-lathe an article having a head—as a bolt, for instance—in order that the shank or part from which the head projects may be turned its entire length, or up to the head, without the necessity of altering the position of the dog on the shank, as becomes necessary, generally speaking, when a common dog is used.

In the drawings, A and B are two jawed plates, each consisting of a rectangular plate, $a$, having a guard or flange, $b$, projecting from it at one end, in manner as represented. The plate B is shorter than the plate A, and each is slotted lengthwise, as shown at $c$, the two slots being of equal width. Each plate on its face—that is, next to its fellow plate—has a series of grooves extending transversely, such grooves being parallel and close together, and each being triangular in cross-section, such being to enable the projections or teeth between the grooves of one plate to fit into the grooves of the other plate. The grooves serve to hold one plate from slipping longitudinally on the other when they are in contact.

Extending through the slots of the two jawed plates A and B is a screw-bolt, C, provided with a nut, D, that is screwed on the bolt. The shank of the bolt where within the slots may be cylindrical or prismatic, it being by preference prismatic, and fitted to the slots so as to prevent the bolt from being revolved in them. The bolt goes through an expansive washer consisting of a headed screw, E, and a headed nut, F, screwed on the shank of the said screw, both screw and nut being bored or tubular to allow of the bolt C going through them concentrically.

In using this dog the washer is at one end to be against the lathe face-plate G, (see Fig. 4,) and the bolt C goes through the two jawed plates and the washer and the slot of the face-plate, and extends in rear of the face-plate, and has the nut D screwed on it (the said bolt) closely up to the back of the face-plate, or against washers placed between said nut and face-plate, the head $h$ of the bolt being against the outer face of the shorter jawed plate, and the back of the longer jawed plate being against the end of the expansive washer. The head of the bolt to be turned is placed between the jaws of the jawed plate, while the lathe center projecting from the arbor or spindle extends through the slot of the longer jawed plate and into the bolt-head. At its opposite end the bolt is to be supported by the projecting center of the tail-stock of the lathe. The expansive washer is to enable the dog to be fastened to the face-plate when the center projecting from the lathe-arbor shall be in the head of the bolt. As different centers as used do not extend from the arbor like distances, it becomes necessary to have the expansive washer between the longer jawed plate and the face-plate, in order to effect the proper adjustment of the center to the bolt-head, which is generally deeper than the bearing-face of either of the jaws. By revolving the nut portion of the expansive washer on the screw-post the length of the washer may be increased or diminished, as may be necessary for the longer jawed plate to be at the right distance from the face-plate for the arbor-center to extend into the head of the bolt to be turned. Each head of the washer may be milled to enable the part to which it is attached to be readily revolved. As the face-plate is revolved by the lathe-arbor the dog will be carried around with the lathe, and will at the same time revolve the bolt to be turned.

We claim—

1. The combination of the two slotted jawed plates with their clamping screw-bolt and nut, and with the expansive washer, substantially as described, consisting of the tubular screw and nut, arranged on the bolt, as set forth.

2. The combination of the two slotted jawed plates, grooved on their next adjacent faces, as described, with their clamping screw-bolt and nut, and with the expansive washer, substantially as specified, consisting of the tubular screw and nut, arranged on the bolt, as represented.

NORMAN HERBERT FAY.
   WALTER SCOTT.

Witnesses:
 GEORGE HAMILTON,
 S. A. BISBEE.